US009611038B2

United States Patent
Dahlstrom

(10) Patent No.: US 9,611,038 B2
(45) Date of Patent: Apr. 4, 2017

(54) MOBILE COMPUTING DEVICE-BASED GUIDANCE NAVIGATION AND CONTROL FOR UNMANNED AERIAL VEHICLES AND ROBOTIC SYSTEMS

(71) Applicant: Working Drones, Inc., Jacksonville, FL (US)

(72) Inventor: Robert L. Dahlstrom, Jacksonville, FL (US)

(73) Assignee: WORKING DRONES, INC., Jacksonville, FL (US)

( * ) Notice: Subject to any disclaimer, the term of this patent is extended or adjusted under 35 U.S.C. 154(b) by 0 days.

(21) Appl. No.: 14/730,187

(22) Filed: Jun. 3, 2015

(65) Prior Publication Data

US 2015/0344136 A1 Dec. 3, 2015

Related U.S. Application Data

(60) Provisional application No. 62/007,209, filed on Jun. 3, 2014.

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B64C 39/02* | (2006.01) |
| *B05B 13/00* | (2006.01) |

(52) U.S. Cl.
CPC .......... *B64C 39/024* (2013.01); *B05B 13/005* (2013.01); *B64C 2201/027* (2013.01); *B64C 2201/042* (2013.01); *B64C 2201/127* (2013.01); *B64C 2201/141* (2013.01); *B64C 2201/148* (2013.01)

(58) Field of Classification Search
CPC ............ B64C 39/024; B64C 2210/027; B64C 2201/042; B64C 2201/127; B64C 2201/141; B64C 2201/148; B64C 2201/027; B64C 39/022; B05B 13/005
USPC .......................................................... 701/3
See application file for complete search history.

(56) References Cited

U.S. PATENT DOCUMENTS

| | | |
|---|---|---|
| 5,552,883 A | 9/1996 | Busch-Vishniac et al. |
| 8,251,307 B2 | 8/2012 | Goossen |
| (Continued) | | |

*Primary Examiner* — Calvin Cheung
*Assistant Examiner* — Paula L Schneider
(74) *Attorney, Agent, or Firm* — Terry M. Sanks, Esq.; Beusse Wolter Sanks & Maire, PLLC

(57) ABSTRACT

A system is disclosed including an aerial vehicle to perform a task to an object, while in an aerial mode that includes at least one of a hover mode or a slow movement mode during a predominant phase of the task being performed, the aerial vehicle has a command and control system, a removable mobile computing device that when attached to the aerial vehicle assists in control of the aerial vehicle and when detached assists in control of the aerial vehicle with user intervention through the mobile device, wherein assist in control is further performed through the command and control system and at least one attachment attachable to the aerial vehicle for facilitating the task performed to the object by the aerial vehicle while the aerial vehicle is in the aerial mode, the at least one attachment is controlled by the removable mobile computing device. Methods are also disclosed.

32 Claims, 11 Drawing Sheets

(56) References Cited

U.S. PATENT DOCUMENTS

| | | | | |
|---|---|---|---|---|
| 8,434,574 B1* | 5/2013 | York | ............... | B60K 16/00 |
| | | | | 180/2.2 |
| 9,033,281 B1* | 5/2015 | Adams | ............... | B64D 9/00 |
| | | | | 244/190 |
| 2009/0205845 A1* | 8/2009 | Hoffman | ............ | A62C 3/025 |
| | | | | 169/43 |
| 2010/0085185 A1 | 4/2010 | Nielsen et al. | | |
| 2011/0212254 A1 | 9/2011 | Morton | | |
| 2013/0134254 A1* | 5/2013 | Moore | ............... | B64D 1/16 |
| | | | | 244/17.11 |
| 2013/0325217 A1* | 12/2013 | Seydoux | ............ | A63H 27/12 |
| | | | | 701/4 |
| 2014/0303814 A1 | 10/2014 | Burema et al. | | |
| 2014/0316614 A1* | 10/2014 | Newman | ......... | G06Q 30/0611 |
| | | | | 701/3 |
| 2015/0041598 A1 | 2/2015 | Nugent et al. | | |
| 2016/0082460 A1 | 3/2016 | McMaster et al. | | |

* cited by examiner

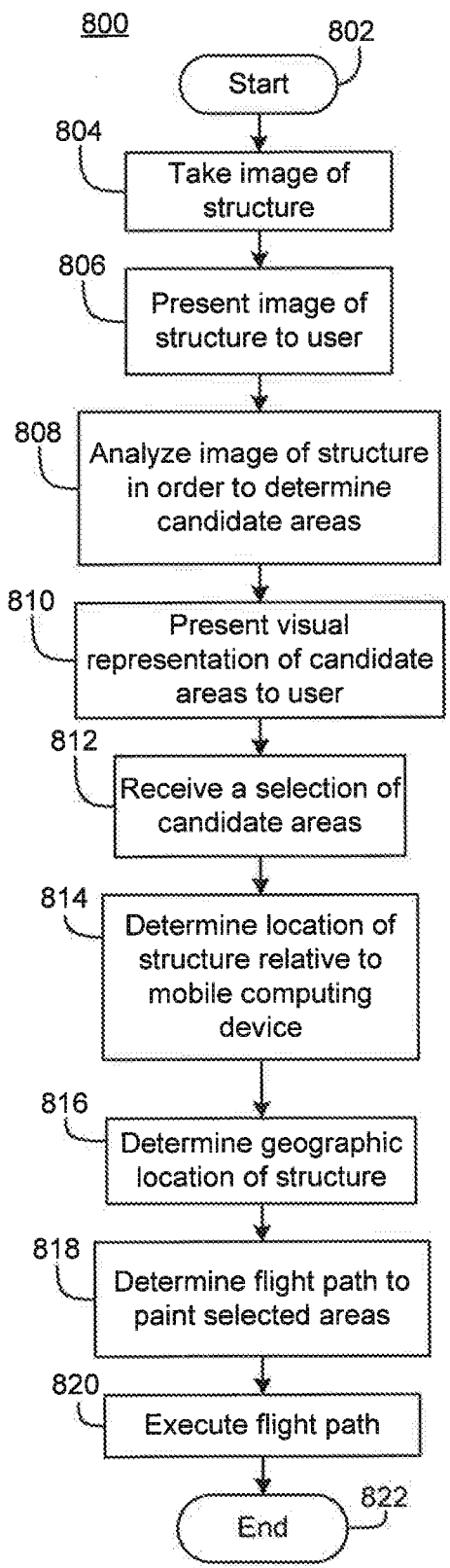
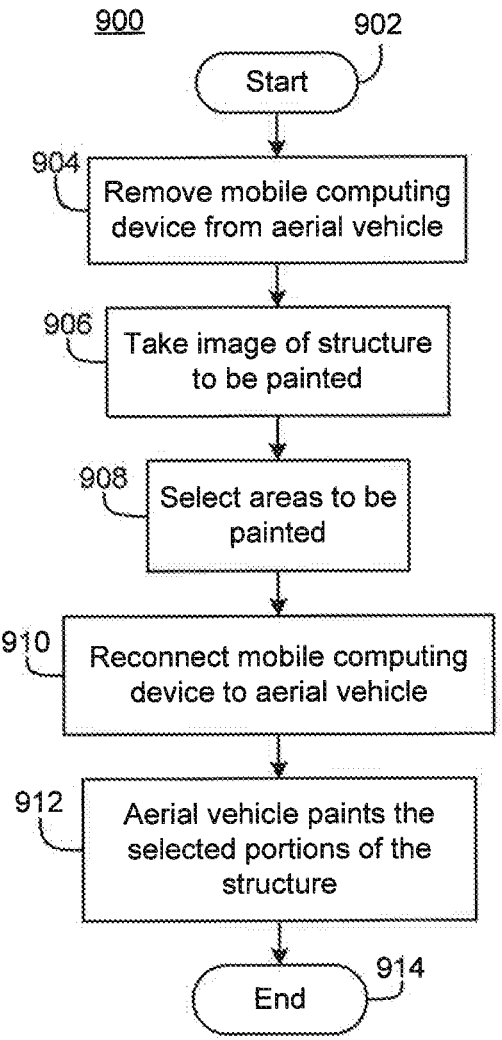
FIG. 8
FIG. 9

MOBILE COMPUTING DEVICE-BASED GUIDANCE NAVIGATION AND CONTROL FOR UNMANNED AERIAL VEHICLES AND ROBOTIC SYSTEMS

CROSS-REFERENCE TO RELATED APPLICATIONS

This application claims the benefit of U.S. Provisional Application No. 62/007,209 filed Jun. 3, 2014, and a Continuation-In-Part of U.S. application Ser. No. 14/674,524 filed Mar. 31, 2015, both incorporated herein by reference in their entirety.

FIELD OF DISCLOSURE

Embodiments generally relate to unmanned aerial vehicles and robotic systems and more particularly to unmanned aerial vehicles and robotic systems control systems and user interfaces.

BACKGROUND

Unmanned aerial vehicles and robotic systems (UAV's) have been used by specialists to perform a variety of complex tasks for many years, however performing such tasks has required significant training, sophisticated ground control computers and powerful onboard guidance navigation and control systems for UAVs. Operating these systems has been beyond the abilities of many lay people.

Consumer-oriented drones, such as the AR Drone® vehicle (available from Parrot société anonyme (sa) of Paris, France) allow novice operators to wirelessly control and fly a small unmanned aerial vehicle via a smartphone (e.g., an iPhone® (available from Apple, Inc. of Cupertino, Calif.) or the like)), computer tablet, small handheld remote control, or the like. The onboard systems of the AR Drone® vehicle may receive wireless signals from the user-provided smartphone and perform simple semi-autonomous tasks, such as taking pictures, flying a pre-programmed pattern, landing, and the like.

Other more sophisticated autonomous and semi-autonomous flying vehicles have been developed which are capable of flying precise flight patterns, identifying and avoiding obstacles in a flight path, picking up objects, and taking off or landing at a desired location.

In some regimes, robotic devices are suited to perform basic, tedious and/or time-consuming tasks. For example, Roomba® cleaning devices (available from iRobot Corporation of Bedford, Mass.) semi-autonomously vacuum interior floors, eliminating or reducing the need for an individual to clean the floor frequently.

Given the foregoing, apparatus, systems and methods are needed which safely facilitate novice users directing autonomous or semi-autonomous aerial vehicles to perform tasks. Additionally, apparatus, systems and methods are needed which reduce or eliminate redundancy in computing devices used to operate unmanned aerial vehicle systems.

SUMMARY

This Summary is provided to introduce a selection of concepts. These concepts are further described below in the Detailed Description section. This Summary is not intended to identify key features or essential features of the embodiments disclosed herein, nor is this Summary intended as an aid in determining the scope of the disclosed subject matter.

Embodiments relate to a system and method providing user control of individual or combined unmanned aerial vehicle and robotic systems to autonomously or semi-autonomously performs a complex, typically labor intensive or unsafe task or operation.

The system comprises an aerial vehicle to perform a task to an object, while in an aerial mode that includes at least one of a hover mode or a slow movement mode during a predominant phase of the task being performed, the aerial vehicle further comprises a command and control system. The system also comprises a removable mobile computing device that when attached to the aerial vehicle assists in control of the aerial vehicle while in the aerial mode and when detached from the aerial vehicle assists in control of the aerial vehicle with user intervention through the mobile device, wherein assist in control is further performed through the command and control system. The system further comprises at least one attachment attachable to the aerial vehicle for facilitating the task performed to the object by the aerial vehicle while the aerial vehicle is in the aerial mode, the at least one attachment is controlled by the removable mobile computing device.

The method comprises identifying an object to apply a material onto with information acquired specific to the object with a detachable mobile computing device that is functionally attached to and detached from an aerial vehicle that while in an aerial mode can apply the material to the object. The method further comprises specifying, with the mobile computing device, at least one specific area on the object to apply the material. The method also comprises developing instructions, including at least one of a flight path, an application blueprint, and a pattern, for the aerial vehicle to follow to apply the material to the object. The method also comprises executing the at least one of flight path, application blueprint, and pattern by the aerial vehicle based on the instructions developed, and applying the material to the object at the at least one specific area based on the instructions developed as directed by the mobile computing device.

Another method comprises acquiring at least one of an image of an object and additional identification information about the object with at least one of a mobile computing device and from a remote location that transmits the image to the mobile computing device. The method further comprises selecting at least one candidate area visible in the image to apply a material by an aerial vehicle, and developing a plan to apply the material with the aerial vehicle, the plan resides in the mobile computing device. The method further comprises attaching the mobile computing device to the aerial vehicle to assist in control of the aerial vehicle during aerial operation of the aerial vehicle, and executing the plan to provide for the aerial vehicle to apply the material in accordance with the plan.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 8 shows a flowchart illustrating an embodiment of a method for an aerial vehicle to identify a structure to be painted, cleaned, etc. and receive instructions on portions of the structure to paint, and paint the structure by determining and executing a flight path;

FIG. 9 shows a flowchart illustrating an embodiment of a method for a user to operate an aerial vehicle using a mobile computing device, causing the aerial vehicle to paint a structure;

DETAILED DESCRIPTION

Figure 1:
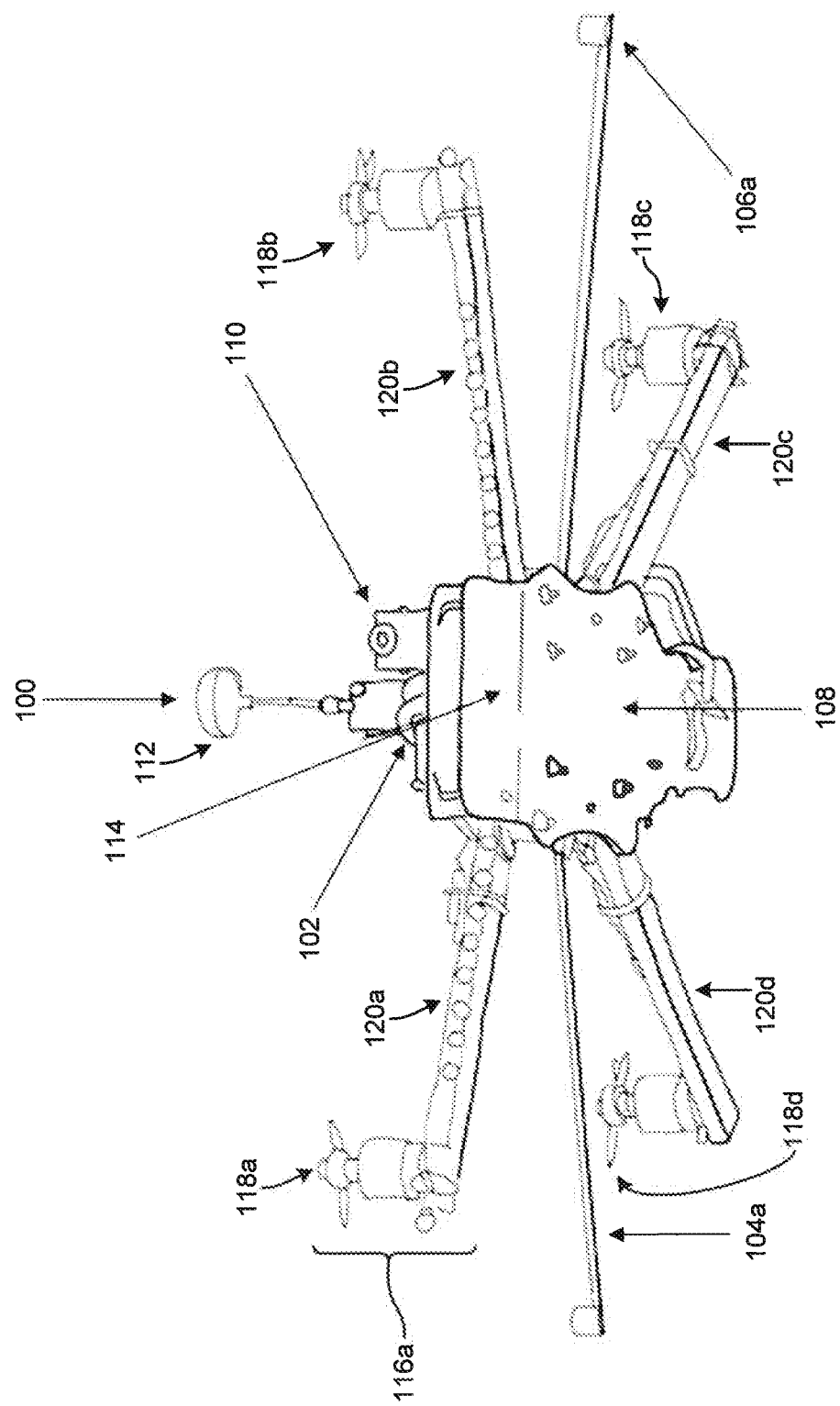
FIG. 1 shows a perspective view of an embodiment of an aerial vehicle having interchangeable components such as arms for connecting and housing tools to perform a variety of tasks.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments disclosed herein are directed to apparatus, systems, and methods which facilitate operation of unmanned aerial vehicles, robotic systems or combinations thereof including vehicles which are designed to perform tasks such as painting surfaces, laying bricks, surveying an area, washing windows or other surfaces, applying coatings, chemicals, sealants, liquid plastics or liquid metals, etc. and the like.

As suggested above, the tasks are not to be limited to painting or coating a surface. An ability to apply or spray a coating may also comprise applying or spraying foam, insulation, water, soap, a cleaning solution, paint, other coatings, chemicals, pesticides, herbicides, plastics, epoxies, liquid metals, resins, ink, liquid concrete, another liquid, a semi liquid material which may include small solid materials, such as "glitter" or pieces or metal or other solid objects and particulate matter, or materials mixed with air or propellants, etc. to a structure or to an object wherein the terms structure and object are interchangeable as neither is meant to be considering limiting. The structure or object may a man-made structure, such as a building, statute, wall, bridge, ship, land vehicle, air vehicle, etc. The structure or object, may also comprise a field, tree, mountain, etc. Thus, the embodiments disclosed herein may be used to extrude any type of material where the nozzle(s), or the aerial vehicle, is the print head, when comparing the system disclosed to a print or additive manufacturing system to any type of structure or object. Furthermore, the material applied by the embodiments disclosed herein are not meant to be limited non-solid materials or elements as discussed above. A solid material or element may also be positioned or applied with the embodiments disclosed herein. Non-limiting examples of such solid material may include, but is not limited to, solid element comprises at least one of a plastic, foam, cardboard, wood, rock, metal, another solid rigid material, and a semi rigid material.

As provided for in further detail below, apparatus, systems, and methods are disclosed which facilitate novice user control of individual or combined unmanned aerial vehicle and robotic systems which autonomously or semi-autonomously performs a complex, typically labor intensive or dangerous or "dirty" task, such as spray coating or painting a portion of a structure, applying pesticides, deicer, or various chemicals, cleaning portions of a structure or vehicle, removing trash or waste, cutting or trimming vegetation, serving as an observation platform for example as a companion or entertainment source, monitoring and inspecting physical objects, data and information gathering, and the like. A hardware interface for drones/robots/UAV's is disclosed which allows the hardware to control and send controls to the processors and embedded systems of the drones/robots/UAV's as well as control other ancillary systems attached or added to the drones/robots/UAV's. A mobile, removable computing device is utilized to provide guidance navigation, control, and/or sub-control. Furthermore, a touch screen or other user interface, such as, but not limited to, a verbal command receiver is utilized for communications between the user and the aerial vehicle. The hardware interface allows programs sub-routines, software and other applications to operate on it or in conjunction with it. Further, the hardware interface allows for remote, wireless, or wired communications with other devices or controllers.

In an embodiment, an aerial operations system for painting and other operations is provided. The aerial operations system includes a base station, an aerial vehicle or motile application "head" or apparatus, a removable mobile computing device and one or more attachments for facilitating tasks such as painting, cleaning, sample collection and the like. In some aspects, the base station is omitted. One or more attachments may be integrated into the aerial vehicle. In some aspects, the aerial vehicle is configured to perform a single purpose, such as painting interior locations.

Figure 2:
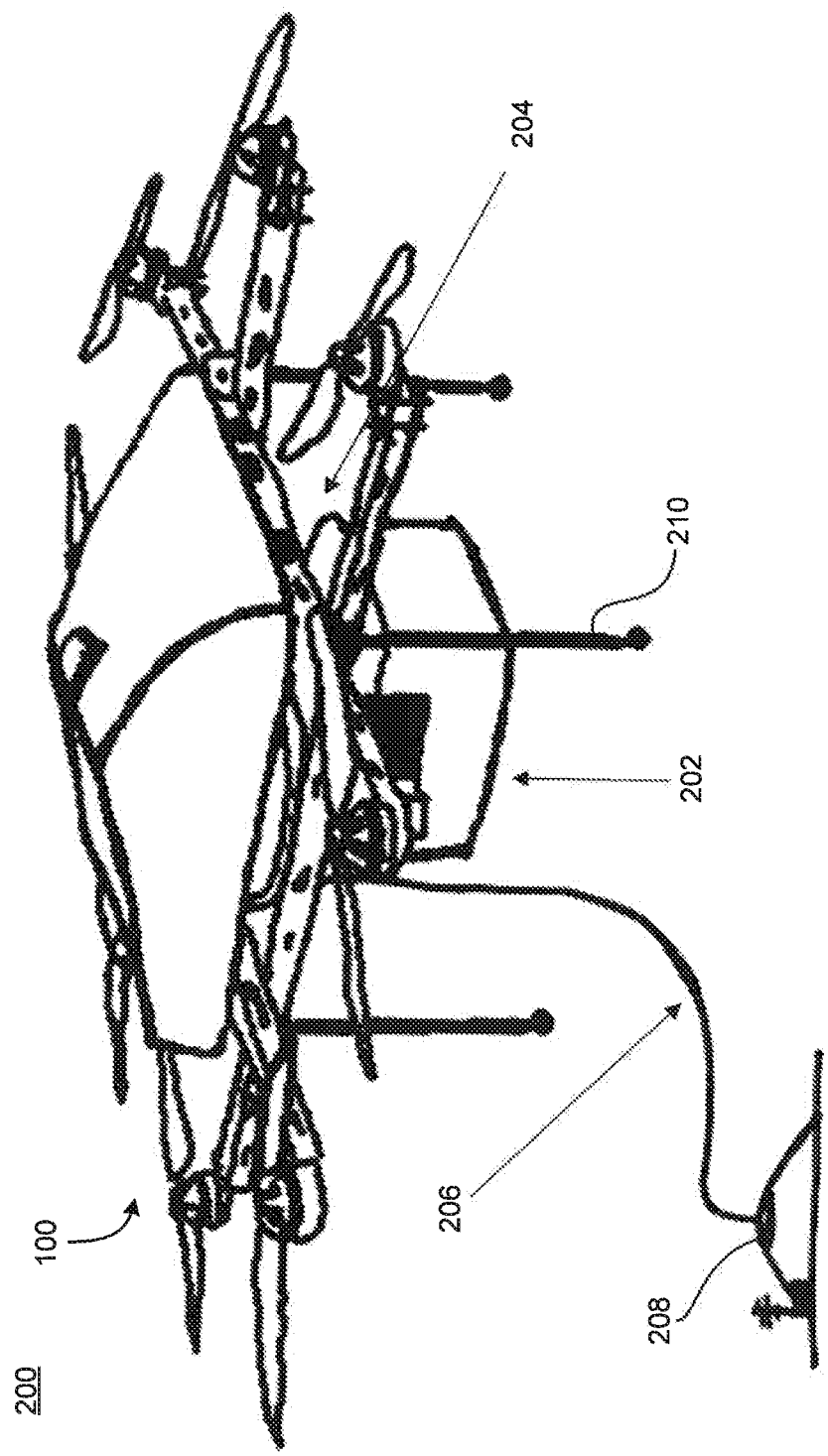
FIG. 2 shows a top perspective view of an embodiment of an aerial operations system showing an aerial vehicle tethered to a base station.
Figure 4:
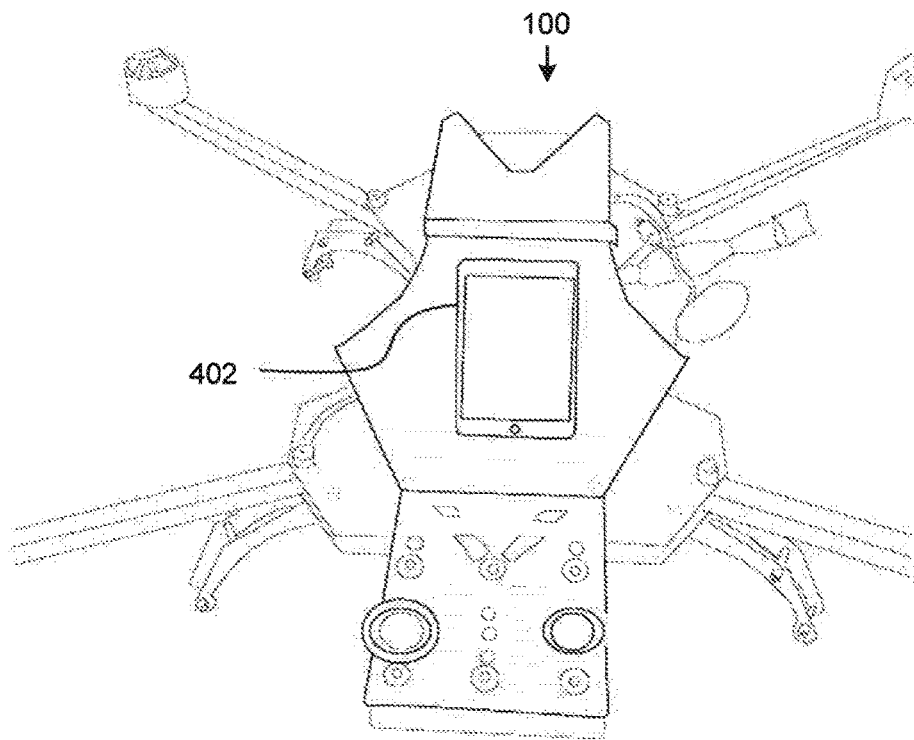
FIG. 4 shows a top view of an aerial vehicle including a removable mobile computing device.

Referring now to FIG. 1, a perspective view of an aerial vehicle having interchangeable components such as, but not limited to, arms for housing tools to perform a variety of tasks, according to an aspect of the present disclosure, is shown. The aerial operations system may be modular and includes an aerial vehicle 100. The aerial vehicle 100 may be capable of vertically taking off and landing, hovering (having a hover or hovering mode) and precisely maneuvering near walls and other structures (having a slow movement mode). The aerial vehicle 100 may be a rotorcraft or vertical take off and landing craft such as a multicopter (e.g., a quadcopter). The aerial vehicle 100 includes vehicle command and control systems 102, multiple components such as, but not limited to, rotor arms 116 (labeled, for clarity, only as rotor arm 116a in FIG. 1), one or more accessories 104 (labeled, for clarity, only as accessory 104a in FIG. 1), a base connection portion 108, at least one sensor, and a power source 114. In an embodiment, the aerial vehicle 100 may include additional elements, as shown in FIG. 2 and FIG. 4 (the tablet 402 shown in FIG. 4). In another embodiment, portions may be omitted from the aerial vehicle 100. Each rotor arm 116 includes a rotor 118 at an end portion of a boom 120 (labeled as booms 120a-d in FIG. 1).

Figure 14:
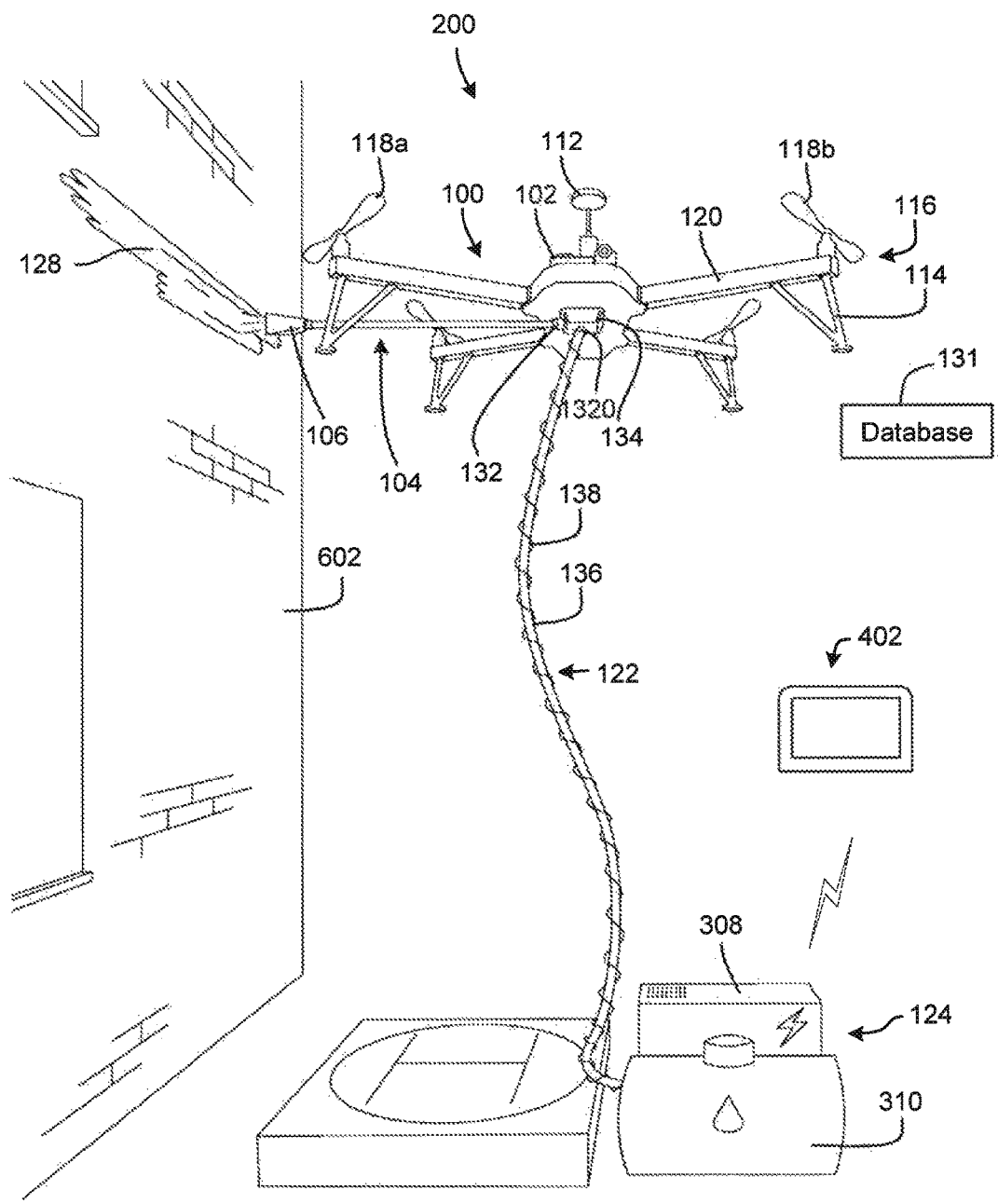
FIG. 14 shows a perspective view of another embodiment of an aerial operations system equipped with a sprayer in operation.

A command and control system 102 may receive inputs from sensors including sensors contained in a sensor area 110 as well as an omnidirectional sensor 112 and/or from a mobile computing device 402 shown in FIG. 4 in order to determine positioning of the aerial vehicle 100 relative to its surroundings and for other tasks/operations. The command and control system 102 (or controlled by the tablet 402 shown in FIG. 4) controls a plurality of rotors 118 (labeled as rotors 118a-d in FIG. 1) in order to pilot aerial vehicle 100, controlling altitude and longitude, including pitch, yaw and angular orientation. The command and control system 102 may receive instructions from a user, in multiple ways including via remote transfer or an onboard device as shown in FIG. 4, with the device detached or attached to the aerial vehicle 100, to fly to a designated area and perform a task (e.g., paint a wall 128 (as shown in FIG. 14), cut in portions of the wall, paint an image on a wall, and the like). Such instructions may be received via direct data connection, wireless data connection, or input via an integrated input device. The aerial vehicle 100 may operate autonomously after receiving instructions. In another embodiment, a user may pilot the aerial vehicle 100 to the designated area and may cause the aerial vehicle 100 to perform the desired task be sending a series of commands (i.e., remote control operation). One such command may be to paint a desired portion of a wall by flying in a raster pattern and spraying paint on the wall during the flying of the pattern. Another command may be to "blot out" an area such as, but not limited to, an electrical receptacle whereby the aerial vehicle 100 would paint the electrical wall receptacle with the same paint of the same color as the surrounding wall and would not cut in around the receptacle leaving it unpainted.

During autonomous or semi-autonomous operation, the command and control system 102 (or controlled by the tablet 402 shown in FIG. 4) may utilize sensors to position the aerial vehicle 100 in advantageous positions and orientations in order to carry out the desired task. As a non-limiting example, where the aerial vehicle 100 is painting a structure, the command and control system 102 (or controlled by the tablet 402 shown in FIG. 4) may pilot the aerial vehicle 100 to an ideal distance away from the structure to paint the structure via an accessory 104 adapted for painting, such as a sprayer, a brush, or other instrument apparent to those skilled in the relevant art(s) after reading the description herein. As a non-limiting example, the accessory 104 may comprise a spray nozzle 106 for applying paint. The spray nozzle 106 may be configured to optimally apply paint when positioned normal to the surface being painted and offset approximately three to six inches. In this instance the command and control System 102 (or controlled by the tablet 402 shown in FIG. 4) may detect the surface using sensors and the pilot aerial vehicle to an attitude and position where the spray nozzle 106 is approximately three to six inches from the surface being painted and normal to the surface. The distance of three to six inches is only used herein as a non-limiting example. Depending on the capabilities of the spray nozzle a closer of further distance may be preferred.

The command and control system 102 (or controlled by the tablet 402 shown in FIG. 4) additionally may control the action of accessories 104. As a non-limiting example, an accessory 104 may be a paint applicator which may be activated by the command and control system 102 when the aerial vehicle 100 reaches the desired location relative to the surface to be painted. The command and control system 102 may be preprogrammed (or controlled by the tablet 402 shown in FIG. 4) with at least one of a flight path, an application blueprint, and a pattern to paint such an object or it may contain algorithms which determine, on-the-fly, the appropriate actions to take in order to paint the specified surface(s). Further, monitors and/or sensors, including video cameras, or paint depth gauges/sensors (namely sensors that touch the wall and measure paint depth or thickness, including, but not limited to, dry film thickness digital gauges) may be attached to the aerial vehicle 100 or an arm or one or more attachments. The monitors and/or sensors can monitor the paint application and adjust the paint flow or paint pressure or require the aerial vehicle 100 to adjust in real time or to complete an additional "pass" over the area with another spray for optimal paint application and coverage. That is, sensors such as, but not limited to, cameras or depth gauges may be used to detect "runs", "skips" or "holidays" (instances where the paint application is not optimal and some of the old paint color may show through). Based on this detection, the command and control system 102 may cause the aerial vehicle 100 to repaint such deficient areas or may adjust spray volume or parameters. Though the above description discusses applying paint, the same approach may be applied to removing paint, such as, but not limited to, spraying a "Stripper" to remove paint. The onboard sensors can determine areas that need an additional application and only apply the additional spray of "stripper" to those areas. In another embodiment, the information from the monitors and/or sensors may be wirelessly sent to the tablet or base station, or sent via the tether system to the tablet or base station for the user to determine if additional paint application is needed.

Figure 10:
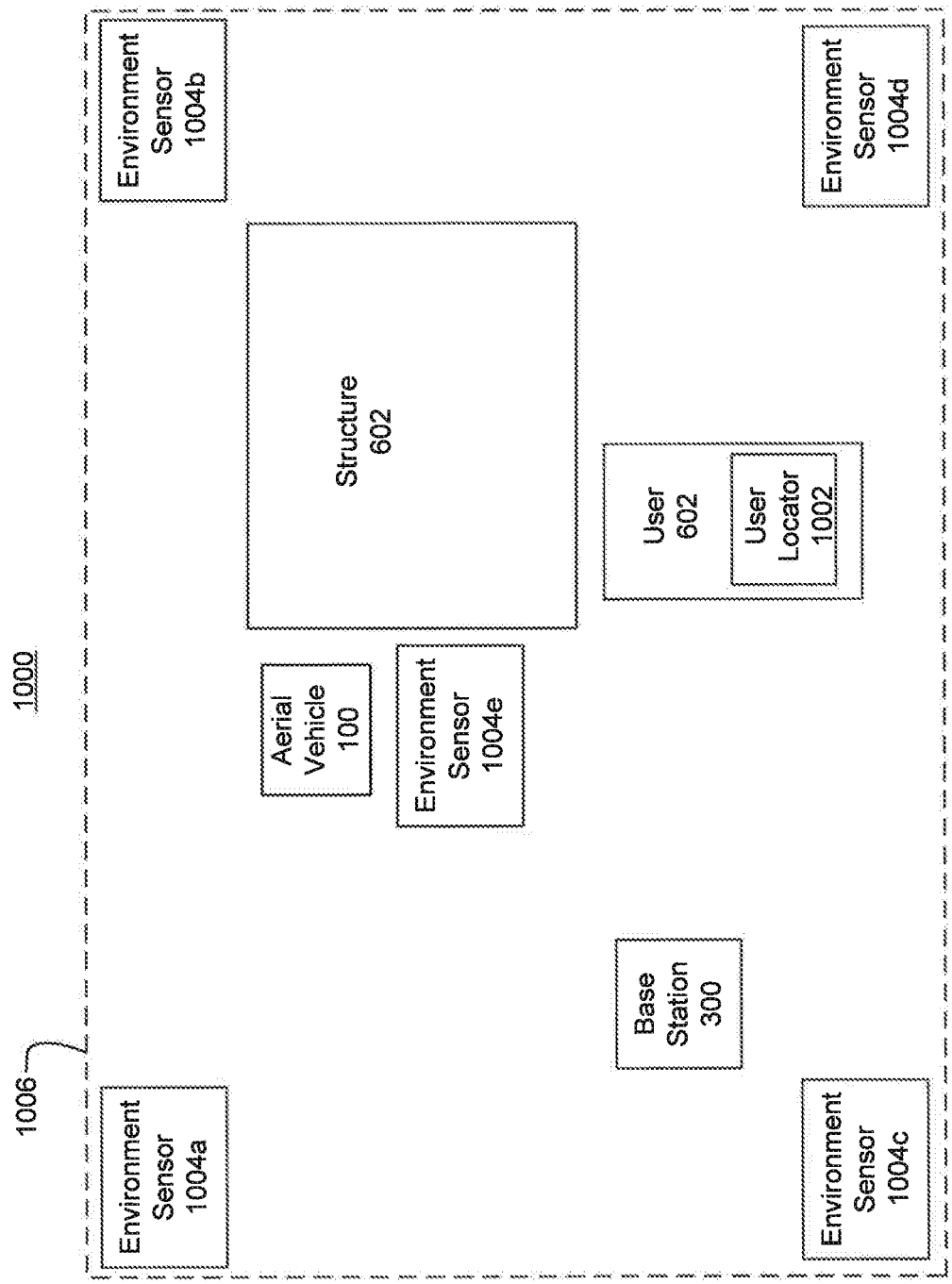
FIG. 10 shows a block diagram of an embodiment of an aerial operations system including a user locator and environmental sensors.
Figure 11:
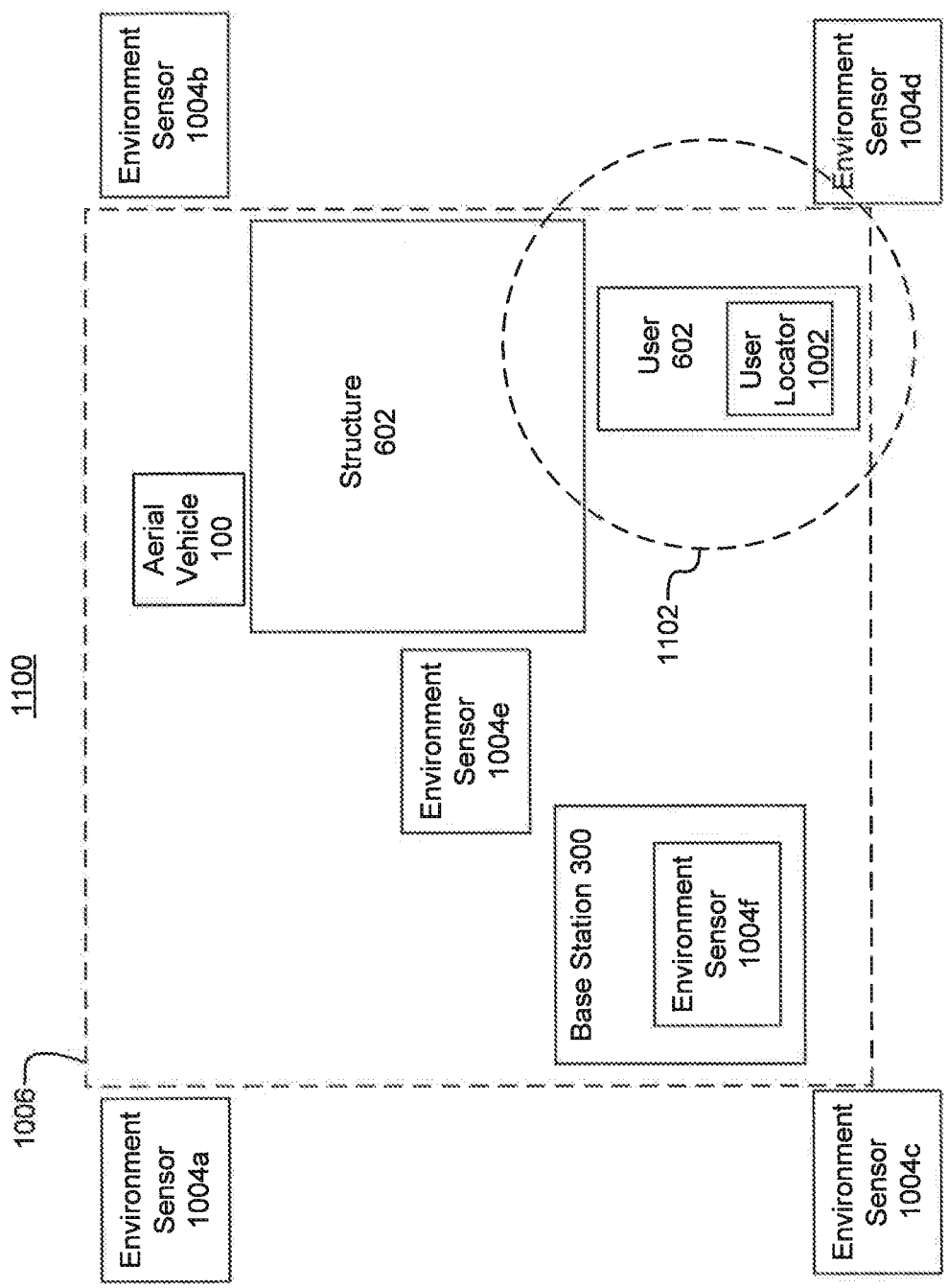
FIG. 11 shows a block diagram of an embodiment of an aerial operations system including a user locator defining a keep out area around a user and environmental sensor.

The aerial vehicle 100 may measure local environment properties such as the ambient temperature, humidity, barometric pressure, and the like, access that information remotely from a repository such as the Internet or from locally deployed environmental sensors (such as sensors in the base station 300 or the remote "micro weather/environmental" sensors including environmental sensors 1004a-e illustrated in FIGS. 10 and 11) in order to determine optimal paint application methods or times or when to apply a subsequent coat of paint. Furthermore, where the aerial vehicle 100 is painting outside or performing other tasks in an environment, the aerial vehicle 100 may be programmed to access weather forecast data from third party sources and determine the appropriate timeframe to complete such tasks. Determining the appropriate timeframe may further include determining an optimal application "mission parameters" i.e. multiple thinner coatings instead of thicker coatings, etc. based on the weather conditions. The aerial vehicle 100 may also access the manufacturer of the paint or material being applied or sprayed or a general knowledge repository such as may be available over the Internet for information about the material being applied. Such information may include, but is not limited to, optimal viscosity, level or volume of material required for various surfaces (such as, but not limited to, the microns of thickness the paint should be applied), known failures or best management practices of application of the material etc. Furthermore, the aerial vehicle 100 may also access the manufacturer of the structure or material being painted or coated for information such as, but not limited to, physical layout and blueprints of the structure as well as optimal coating material (i.e. paint or coating) and application process (such as viscosity or atomization level of the paint and particulate matter) to use on the physical material (steel, aluminum, brick, wood, etc.) including, but not limited to, best management practices for maintenance of the structure and structure material such as, but not limited to, application best management practices or specifications including, but not limited to, specific types of coatings to best ensure coating aesthetics, corrosion protection, rust prevention or the integrity of the structures materials.

The accessory 104 may be one or more appendages or other member attached or removably attachable to the aerial vehicle 100. The accessory 104 may be changed in order to adapt the aerial vehicle 100 to specific uses. The accessory 104 may comprise an accessory tip 106, such as, but not limited to, a spray nozzle, as described above. In an embodiment, the aerial vehicle 100 may comprise multiple accessories 104. Some accessories 104 may be equipped with sensors such as pressure sensors in order to aid in precisely identifying the location of walls and the like. The accessory 104 may include similar sensors to the sensors included in sensor area 110. Some accessories 104 may include functional appendages that affect actions such as spraying, rubbing or wiping, cutting, grabbing, cutting, sanding, polishing and more.

The accessories 104 may be rigidly mounted to the aerial vehicle 100 or they may be mounted for movement. The accessory 104 mounted for movement may comprise one or more motors or actuators controllable by the command and control system 102 (or controlled by the tablet 402 shown in FIG. 4) in order to adjust the orientation of, for example, attached spray nozzle 106. Such movement is advantageous for cleaning, painting, orienting the accessory 104 to reach or point in directions that are otherwise inaccessible and the like. Specifically, a painting accessory attached for movement to the aerial vehicle 104 may be pitched upward by causing a motor to point the accessory 104 upward, altering the attitude of the aerial vehicle 100 by pitching a portion of the vehicle upward, or both, in order to cut in near the top of an interior wall. Such action may be necessary in order to avoid running into the ceiling or other obstacle avoidance.

One or more accessories 104 may be a rotating brush, rags, sponge, or other cleaning device configured to clean portions of the surface that the aerial vehicle 100 will paint, wash, or otherwise interact with. In this manner the accessory 104 may brush dirt or other material off the surface, ensuring that paint adheres to the surface more readily. Alternatively, cleaning and polishing via the aerial vehicle 100 may be facilitated.

One or more accessories 104 may be an appendage that discharges compressed air or other gases. Amongst other things the air can be blown over a surface to remove or dislodge dirt or other material off the surface, in some instances to ensure that paint adheres to the surface more readily, in other instances to ensure leaves or snow, etc. are removed and in other instances to ensure transparence for windows or glass or solar collectors, etc.

The aerial vehicle 100 may be configured to dock with a base station 300 (shown in FIG. 3) via an underside portion of the aerial vehicle such as base connection portion 108 or the base of the feet or landing legs 210. The base connection portion 208 may include power and data connectors for recharging or otherwise refilling an onboard power source 114 and receiving or transmitting flight and operation information. The base connection portion 108 may also include connections for receiving items such as paint, water, cleaning fluids, chemicals, solid objects, and the like.

The sensor area 110, as discussed above, may include one or more sensors which aid the operation of the aerial vehicle 100. Such sensors may include cameras, infrared sensors, GPS transceivers, magnetometers, laser range finders, sonar, lidar, radar, chip-scale combinatorial atomic navigation (C-SCAN), Quantum Assisted Sensing (QuASAR), Visual Simultaneous Localization and Mapping (vSLAM), and other types of sensors or positioning devices apparent to those skilled in the relevant art(s) after reading the description herein. Inertial sensors, displacement sensors, gyroscopes, and other devices may also be integrated into sensor area 110. The sensors at the sensor area 110, the omnidirectional sensor 112, sensors located on other portions of the aerial vehicle 100 and the command and control system 102 plus the mobile computing device 402, shown in FIG. 4, may operate in concert to form a guidance navigation and control system for the aerial vehicle 100.

The aerial vehicle 100 may further include one or more visual or audio alert devices such as speakers, LEDs, other lights, and the like. Such alert devices may be utilized to warn bystanders to avoid the aerial vehicle 100, or indicate status of the aerial vehicle 100 (e.g., battery status, onboard supply status, task completion status, situational awareness warnings, or limitations or impediments to completing tasks).

In an embodiment, the aerial vehicle 100 is battery powered and the power source 114 is a rechargeable battery. In another embodiment, the aerial vehicle 100 is powered by liquid or gaseous fuels and the power source 114 is a storage tank for such fuel. The aerial vehicle 100 may also be powered by a tether connected to the base station 208, or another location such as, but not limited to, an electrical outlet.

In an embodiment, the aerial vehicle 100 may upload data from its use to a remote database 131. The remote database 131 may receive data from one aerial vehicle 100 or many aerial vehicles 100. The remote database 131 may store information related to the locations of buildings aerial vehicles 100 work on, the conditions of the surfaces being painted an/or cleaned, weather conditions at time of operation, the amount of paint or cleaner used and the like. Among other things, collection of this information allows an aerial vehicle producer and coatings materials manufacturer to track efficiency and efficacy of aerial vehicles models, impacts or conditions and situational variables and parameters, identify improvements that can be made and proactively inform users that a particular aerial vehicle 100 is functioning poorly which may indicate a problem. Collection of data can also create highly accurate detailed maps and physical conditions of structures and the physical world, such as, but not limited to, identifying physical issues with a structure, (e.g., the third window from the left on the 15$^{th}$ floor has a crack in the glass).

Referring now to FIG. 2, a top perspective view of an aerial operations system 200 showing tethered aerial vehicle 100, according is shown. The aerial vehicle 100 may have legs/wheels 210 to enable it land and/or roll along a floor or inclined surface (to paint baseboards, etc.). Such legs/wheels 210 may also be utilized to connect to the base station 208 or other location to receive power, refill the onboard power source 114 and receiving or transmitting flight and operation information. Furthermore, the legs/wheels/skids 210 may be configured to receive items such as paint, water, cleaning fluids, de-icing solutions, chemicals, insecticides, pesticides, solid objects, and the like. In other operations, such legs/wheels/skids 210 may be utilized for travel over land or water to reach an intended destination without the aerial vehicle 100 having to fly or leave the ground surface.

Figure 3:
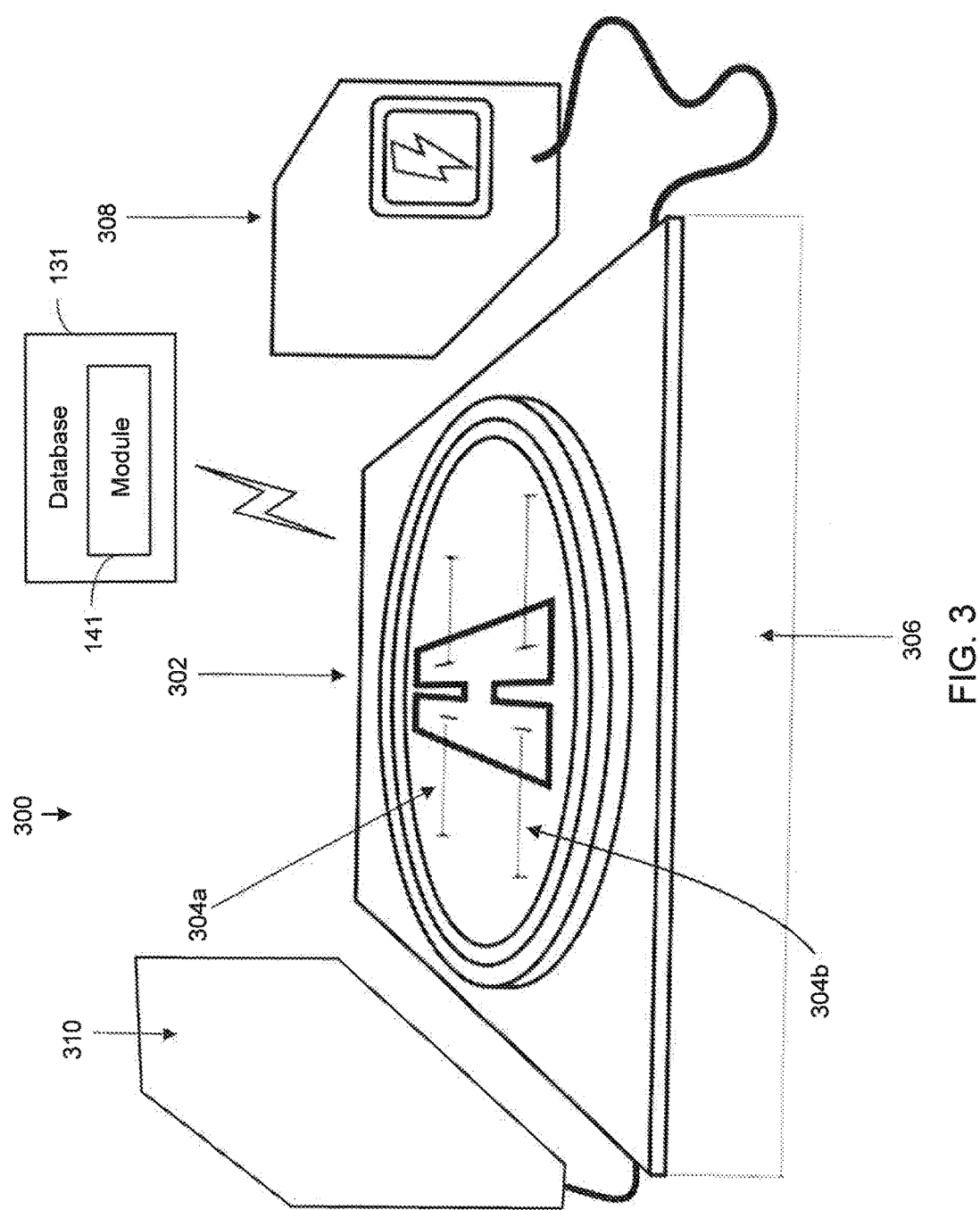
FIG. 3 shows a perspective view of an embodiment of a base station configured to provide power and data connections to an aerial vehicle.

In an embodiment, the aerial vehicle 100 may comprise a container 202. The container 202 may hold liquid or other material to be dispersed. In an embodiment, the aerial vehicle 100 may be equipped with a vacuum accessory 104, a "scoop" or similar accessory, or any of a number of accessories to retrieve/receive material including gaseous, liquids, solids, small animals and insects, soil samples, etc., wherein the container 202 may be configured to hold the collected material. The container 202 may be filled or emptied by a user or by portions of the base station 300 or by an automatic container "rotator" that is part of the base station 300, as shown in FIG. 3. The container 202 may be modular and detachable via container connectors 204, thereby enabling the aerial vehicle 100 to rapidly connect and disconnect from the container 202. In an embodiment, the connection is performed autonomously. Though not disclosed to be limiting, the container 202 may be a one-gallon, one-quart, or other standard size paint can, canister, or container.

The aerial vehicle 100 may be attached to the ground or a tether base 208 via a tether 206. In an embodiment, the tether 206 may be electrically connected to the aerial vehicle 100 and connected to the local power grid via, as a non-limiting example, a domestic outlet, in order to provide power to the aerial vehicle 100. The tether 206 may be connected to the container 202 or another portion of the aerial vehicle 100 to provide for receiving or discharging fluids or other material. As a non-limiting example, the aerial operations system 200 may comprise the base station 300 having a large paint reservoir 310 (shown in FIGS. 13 and 14). Paint from the large paint reservoir 310 may be transported to the aerial vehicle 100 via the tether 206 connection. The tether 206 is a length appropriate for or longer than needed for performing the desired task. Furthermore, the tether 206 may be capable of varying its length based on the requirements and needs of the aerial vehicle 100. The tether 206 may also be used to exchange data and information between the base station 208, or some other connected device, and the aerial vehicle 100. The tether 206 may be designed to be used in underwater and other environments, such as, but not limited to, inside pipes and tanks or ducts or crawl spaces.

Referring now to FIG. 3, a perspective view of an embodiment of a base station 300 configured to provide power and data connections to aerial vehicle 100 is shown. The base station 300 may provide power, data, and fluid reservoirs for the aerial vehicle 100 to facilitate operations. In an embodiment, the base station 300 may be mountable on top of large paint buckets such as a five-gallon bucket.

The base station 300 may include a landing pad 302. The landing pad 302 may have machine readable markings in assist the aerial vehicle 100 during landing. The base station 300 may employ sensors, lights, GPS, Infrared emitters, other emitters, sonar, LIDAR, radar and the like, passive systems such as retro reflective infrared materials, etc. to assist the aerial vehicle 100 in determining and monitoring a location of the aerial vehicle 100. The landing pad 302 may also include power and data connections 304 (labeled, for clarity, only as connections 304*a-b* in FIG. 3) which the aerial vehicle 100 connects with upon landing. The landing pad 302 may be a fabric-like or plastic material that can be "rolled up" or "rolled out" for use by the aerial vehicle 100. A power supply 308 is electrically connected to power connections 304. One or more reservoirs 310 containing selected fluids or other materials may be integrated or otherwise connected to the base station 300 to provide such material to the aerial vehicle 100. The base station 300 may further include a platform 306 configured to attach the base station to other physical devices or objects. In an embodiment, the platform 306 may be configured to attach to a bucket 402, shown in FIG. 4, to facilitate painting and other operations.

Referring now to FIG. 4 a top view of aerial vehicle 100 including a removable mobile computing device 402 is shown. The mobile device 402 may be a mobile computing device such as a tablet computer or a smart phone. The mobile device 402 may be a commercial off the shelf (COTS) tablet computing device, smart phone or a customer computing device or any number of modified or augmented COTS computing systems. The mobile device 502 is removable from the aerial vehicle 100 and is used by the system 200 operator to provide command and control for the aerial vehicle 100 or removed and then reattached to the aerial vehicle 100. The mobile device 502 may also be used to actively or passively provide guidance, navigation and control signals or other information to the aerial vehicle 100.

The mobile device 402 connects to the systems of the aerial vehicle 100 via wireless connection or a wired connection or when attached to the aerial vehicle 100. Via this connection, the mobile device 402 also receives input signals from sensors onboard the aerial vehicle 100. The mobile device 100 may also include sensors which assist in determining the longitude, altitude and location of the aerial vehicle 100 such as a gyroscope, an accelerometer, one or more cameras and the like. In an embodiment, when connected to the aerial vehicle 100, the mobile device 100 handles all guidance, navigation, and control for the aerial vehicle 100, including operating attachments such as the spray nozzle 106 and other painting, cleaning or coating or task oriented attachments. In another embodiment, the mobile device 100 handles the majority of such functionality. A user may physically detach the mobile device 402 from the aerial vehicle 100 and, via a user interface, provide operation instructions for the aerial vehicle 100, such as, but not limited to, a desired flight path, task to be completed, and the like.

Figure 5:
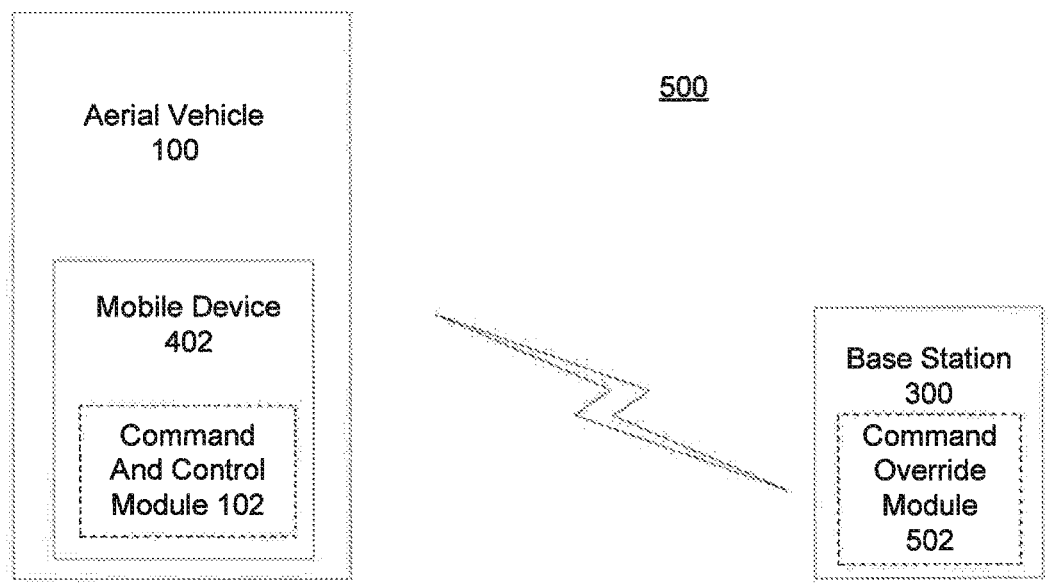
FIG. 5 shows a dataflow diagram depicting an embodiment of operation of the aerial operations system.

Referring now to FIG. 5, a dataflow diagram 500 depicting wireless operation of the aerial operations system 200, aerial vehicle 100 including mobile device 402 is shown. The aerial operations system 200 comprises the base station 300 and the aerial vehicle 100. The aerial vehicle 100 includes the mobile device 402 containing the command and control system modules 102 or communicating with an embedded command and control system onboard aerial vehicle 100 or the operations system 200. A user may input commands via the mobile device 402. The base station 300 includes a command override module 502 and user controls which enables the user to deactivate the aerial vehicle 100 or otherwise cause the aerial vehicle 100 to return to base or the ground should the need arise prior to the completion of the flight path provided to the mobile device 402. In and embodiment, another device, such as cellular transceiver, cellular telephone, tablet, or portions thereof which can communicate with the base station 300, the aerial vehicle 100, or both devices and may send override commands to the aerial vehicle 100. In an embodiment, commands provided to the module 102 are general (e.g., proceed to position X, scan the wall, process the scan, determine areas to be painted and paint the wall) and the command and control system 102 determines the appropriate actions to carry out the command. In another embodiment, the command module 102 receives a general command and generates sub-commands in order to execute the general command. In another embodiment, the command and control system 102 transmits the information to an operator or remote facilitator or supervisor who approves or modifies the action plan the command and control system 102 would then execute, or carry out. The aerial vehicle 100 may transmit data and information back to the base station 300.

Figure 6:
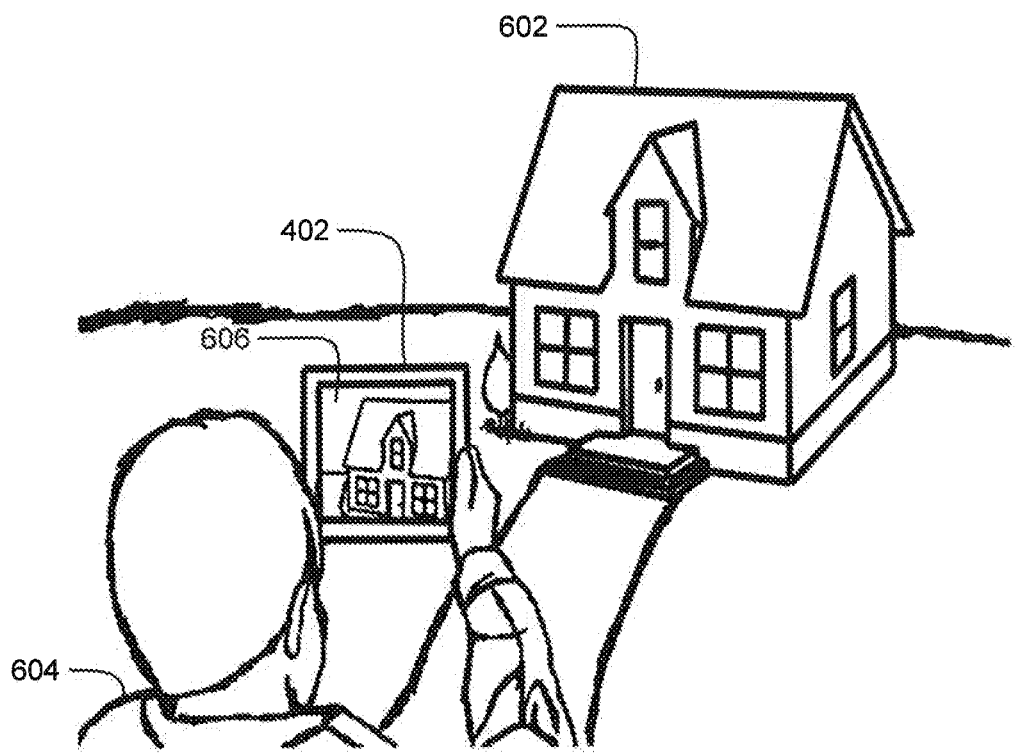
FIG. 6 shows an image of a user taking an image of a target structure using an embodiment of an aerial vehicle's mobile computing device.
Figure 7:
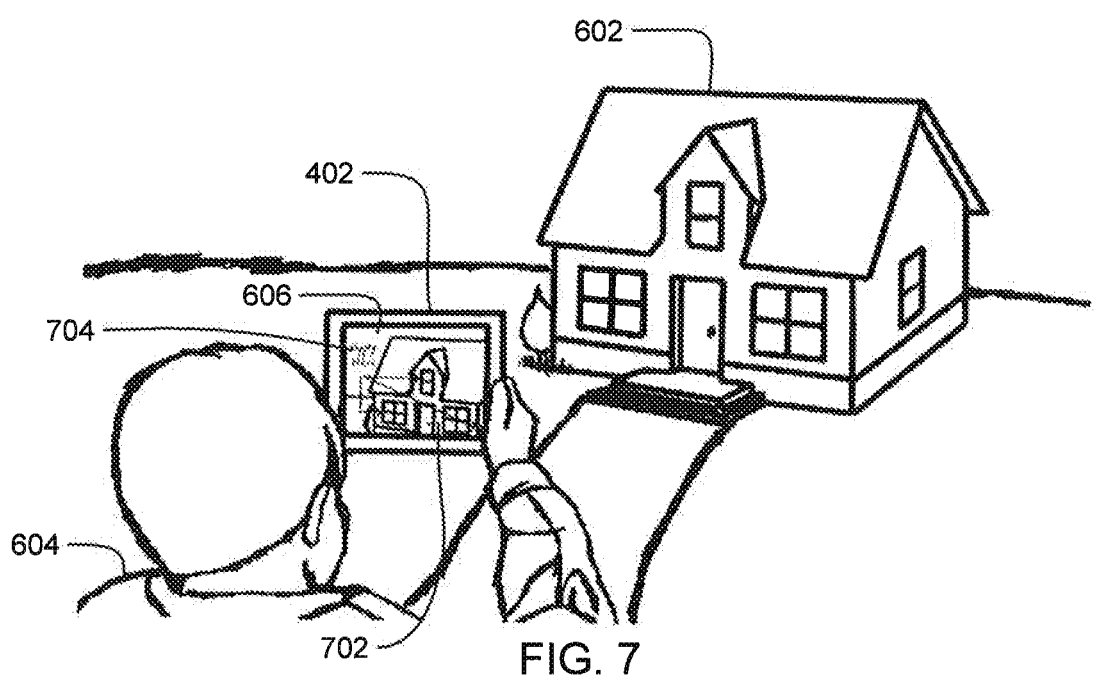
FIG. 7 shows an image of a user viewing candidate areas for painting or cleaning, etc. by the aerial vehicle.

Referring now to FIGS. 6 & 7, an image of a user 604 taking an image 606 of a target structure 602 using an aerial vehicle's mobile computing device 402 and an image of user 604 viewing candidate areas 702 for painting by aerial vehicle 100 are shown. More specifically, FIG. 6 shows an embodiment of a mobile computing device or camera whereby the image may be wirelessly or via wire transferred to the aerial system 100 or base station. The user 604 may remove the mobile device 402 from the aerial vehicle 100 and utilize its user interface in order to provide commands, flight plans, and the like. In an embodiment, the aerial vehicle 100 is equipped to autonomously or semi-autonomously paint exterior surfaces of a structure 602, such as, but not limited to a house. The user 604 may easily select the portions of the structure 602 to paint by first taking an image 606 or series of images of the structure 602 via onboard cameras within the mobile device 402.

As shown further in FIG. 7, the mobile device 402 may analyze the image 606 and present the user 604 with a candidate area 702 for painting, or performing some other task. The candidate area 704 may be presented to the user 604 by highlighting the area, as shown. More than one area 704 may be identified. In another embodiment, the mobile device 402 presents the candidate area 702 to the user 604 by other mechanisms apparent to those skilled in the relevant arts after reading the description herein. The user 604 may accept candidate areas 702, or modify the selections, and the related aerial vehicle 100 operations by clicking, or selecting an acceptance button 704 or indicator. As a non-limiting example, the structure 602 is scanned and a report may be provided that, for example specifies windows need cleaning whereas other windows do not. As another non-limiting example, information identifying that a specific section may need painting whereas another section may only need. "spot treatments" while another section does not need any coating or paint. Thus, considering the non-limiting examples, the mobile device 402 may apply a grid, template, or another mapping approach to overlay the image 606 to assist in identifying to the user 604 what areas of the structure 602 need or do not need attention.

In an embodiment, the image 606 is not generated in real time. Instead, the image 606 may be generated beforehand, pulled from third-party databases (e.g., a database associated with the Google Streetview® service (available from Google, Inc. of Mountain View, Calif.) or the like). In another embodiment, the image 106 may be a combination of real time image and data plus pre-generated images or data. The image 106 may be provided or presented with overlaid additional images, data or information. As a non-limiting example, the image may be overlaid with a color to facilitate an operator "envisioning" a color of paint to apply to a specific area of the structure. Further, additional overlays of information or data may be provided such as, but not limited to, coating x has an expected lifespan vs coating b which may have a different lifespan, coating a has a cost of z dollars while coating b has a cost of x dollars, removal of trees or vegetation from section c would impact utility bills by x dollars, installation of solar reflective tinting on windows would impact utility bills by x dollars, and the like.

Referring now to FIG. 8, a flowchart illustrating an embodiment of a method 800 for the aerial vehicle system 200 including the mobile device 402 to identify the structure 602 to be painted, receive instructions on portions of the structure 602 to paint, and paint the structure 602 by determining and executing at least one of a flight path, an application blueprint, and a pattern is shown. Process 800, which may utilize the aerial system 200 and the mobile device 402, begins at step 802 with control immediately passing to step 804. At step 804, the mobile device 402 takes an image 606 of the structure 602 or retrieves a previously taken image from an external or internal (previously saved photograph) data source. The user 604 may detach the mobile device 402 from the aerial vehicle 100 and take the image 606. In an embodiment, data is collected about the structure 602 by another means such as radar detection, laser range finding, optical surveys and the like. A non-limiting example may include the system 200 flying to the structure 602, surveys it, takes images, and returns to the user 604. The images 606 include data (such as the direction the camera is pointing, distance to the object from the current lat/long and elevation coordinates of the "tablet" etc.) and Meta data (such as the lat/long location, date of photo, camera or sensor information and data, etc.).

At step 806 the representation of the structure collected in step 806 is presented to the user 604 via the user interface of the mobile device 402. In an aspect, image 606 is presented to user 604 as shown in FIGS. 6 & 7. In another embodiment, the image 606 or another representation may be sent to a separate onsite computing device or an offsite computing device for viewing and approval. At step 808, an image analysis module 141 is employed to determine appropriate candidate areas 702 for performing the task the user 604 wishes the aerial vehicle 100 to carry out. The image analysis module 141 may be communicatively coupled to databases containing information, including images and/or point clouds of portions of structures which the aerial vehicle 100 may be directed to avoid and/or interact with. As a non-limiting example a database may contain images of standard window frames. Such images may be used to identify portions of the structure 602 which should not be painted. Upon using these techniques, and other methods known to those skilled in the relevant art(s) to identify candidate areas 702, process 800 proceeds to step 810. In another non-limiting embodiment the image analysis module 141 is a part of the mobile computing device.

At step 810, a representation of candidate area 702 is presented to the user 604. The image 606 with highlighted overlays may be presented to the user 604 via the mobile device 402. The candidate area 702 is presented to the user 604 for the user's approval or editing. At step 812, the mobile device 604 receives a selection of areas to be painted. In an embodiment, steps 808 and/or 810 are omitted and the user 604 inputs a selection of areas to be painted without the mobile device 604 performing an analysis of the image 606. Other options may also be presented to the user 604 at this time, such as, but not limited to, a painting technique to use, operations work time (i.e. take off at 8 am and upon reaching destination start painting, etc.), suggested coating materials, and the like.

At step 814, the image 606 is analyzed to determine the location of the structure 604 relative to where the image 606 was taken by the mobile device 402. In another embodiment, other techniques may be utilized to determine where the structure 604 is relative to the mobile device 402, including, be not limited to, retrieving structure data from an external source such as Google Streetview available from Google, Inc. of Menlo Park, Calif.) and the like. At step 816, the geographic location of structure 602 is determined. One manner of determining the geographic location of structure 602 is to first determine the location of the mobile device 402 when the image 606 was taken and then offsetting that location by the relative location of the structure 602 determined in step 814. In an embodiment, the information collected in steps 814 and 816 is necessary in order to determine the location of the structure 604 and provide an accurate flight path, an application blueprint, and a pattern for the aerial vehicle 100. In another embodiment, the absolute location of the structure 602 is not necessary and one or both of steps 814 and 816 may be omitted.

At step 818, at least one of a flight path, an application blueprint, and a pattern is determined to guide the aerial vehicle 100 to the structure and paint the structure 602. The at least one of flight path, application blueprint, and pattern may be determined by the command and control module 102, input by the user 604, or provided in whole or in part by a third party individual or service. In an embodiment, a portion of the at least one of flight path, application blueprint, and pattern may be predetermined prior to execution of the task and the remainder may be determined during execution of the task. At step 820, the aerial vehicle 100 performs the commanded task and executes its flight path, application blueprint, and/or pattern. In an embodiment, the aerial vehicle 100 executes several flights in order to complete the selected task. As a non-limiting example, the aerial vehicle 100 may resupply, recharge and/or receive additional flight instructions by periodically docking with the base station 300 during operations. Process 800 then terminates at step 822.

Referring now to FIG. 9, a flowchart illustrating an embodiment of a method 900 for the user 604 to operate the aerial vehicle 100 using the mobile device 402, causing the aerial vehicle 100 to paint the structure 602 is shown. The method 900, which may utilize the aerial system 200 and the mobile device 402, begins at step 902 with control immediately passing to step 904. At step 904, the user 604 removes the mobile device 402 from the aerial vehicle 100. In an embodiment, power and communications connections must be disconnected. At step 906, the user 604 takes a picture of the structure 602 via an onboard camera within the mobile device 402. The image 606 is then presented to the user 604. At step 908, the user 604 selects at least one candidate area 702 of the image 606 to be painted by the aerial vehicle 100. At step 910, the user 604 reconnects the mobile device 402 to the aerial vehicle 100, thereby preparing the aerial vehicle 100 to carry out the indicated painting task. At step 912, the aerial vehicle 100 executes the indicated painting task. The method 900 then terminates at step 914.

Referring now to FIGS. 10 and 11, block diagrams 1000 and 1100 of the aerial system 200 being used to paint the structure 602 are shown. The user 602 has a user locator 1002 and environmental sensors 1004 (labeled as environmental sensors 1004*a-f* in FIGS. 10 and 11) deployed. The aerial system 200 may include the aerial vehicle 100 having the mobile device 402, as previously disclosed herein. The aerial system 200 may further include a user locator 1002 communicatively coupled to the aerial vehicle 100 and/or the base station 300. The user locator 1002 periodically or continuously sends the user's location to other portions of the aerial system 200 in order to inform the aerial vehicle 100 of the user's location and cause the aerial vehicle 100 to alter its flight path, application blueprint, and/or pattern in response to the location of user 602. In an embodiment, the user locator 1002 sends this information to a third-party service (e.g., an application service provider's web service) which provides the information and/or instructions to the base station 300 or the aerial vehicle 100.

The user locator 1002 may include a command override module 502, thereby enabling the user 602 to abort operation or take manual control of the aerial vehicle 100. The user locator 1002 may contain additional commands such as a "land immediately" directive, "return to base" command, play a sound, flash lights, or the like, to facilitate locating the aerial vehicle 100, and the like. Further, the command override module or other function of the system may notify users, manufactures, law enforcement, etc. of events or occurrences. As a non-limiting example, if the spray nozzle clogs and the unit cannot complete its task it could send a text message or other communication to the system operator, user or administrator.

In response to the user location transmitted by the user locator 1002, the aerial vehicle 100 flight path, application blueprint, and/or pattern may be altered to keep the aerial vehicle 100 away from the user 602. In an embodiment, multiple individuals may carry user locators 1002, enabling each individual to work or move around the area the aerial vehicle 100 is operating in while having the aerial vehicle 100 maintain a safe distance from each individual. In an embodiment, the aerial vehicle 100 periodically brings items or otherwise interacts with the user 602. In another embodiment, the aerial vehicle 100 may home in on the user locator 1002 or otherwise travel to the location sent by the user locator 1002 to interact with the user 602.

The user locator 1002 may be a user mobile device equipped with a downloadable application which sends the user's location to the aerial vehicle 100 and contains the commands described above. The onboard location sensors of the mobile device (e.g., GPS transceiver) may collect the necessary data to send to other portions of the system 200. In an embodiment, the user locator 1002 is a fob, sensor, or another active or passive physical device which the user 602 carries. In another embodiment, the user themselves may be the locator (i.e. the system tracks and "knows" the location of the user). The device 1002 is equipped with the necessary relational or absolute location sensors to provide the system 200 with information about the location of the user 602. Such user locators 1002 may also contain communications equipment and a user interface (e.g., buttons, a touchscreen) to allow the user 602 to send the aforementioned commands.

The aerial vehicle 100 may be programmed to operate within a defined operational area 1006 (shown as a dashed box in FIG. 10). An operational area 1006 need not be physical barriers. Rather, the aerial vehicle 100 may be programmed to remain within a specified geographic area, such as within the metes and bounds on a single property, within a geo-tagged or geo-fenced location or another informational limiter. The operational area 1006 may be defined exclusively in code or the operational area 1006 may be defined by physical objects placed at the borders, or within the operational area 1006. As shown in FIG. 11, the operational area 1006 may be tightly bound around the structure 602 and the base station 300, or given a wider area as shown in FIG. 10.

In an embodiment, a keep out zone 1102 may be defined around the user 602 or individuals within the operational area 1006. As a non-limiting example, the keep out zone 1102 may be a sphere with a defined radius around the user 602 or the user locator 1002.

The environmental sensors 1004 may be deployed or otherwise integrated into the system 200 to sense weather conditions at the site of the structure 602. Local weather conditions such as wind gusts affect the ability of the aerial vehicle 100 to function. Advance warning and/or more precision measurement of such conditions enables the aerial vehicle 100 to operate more efficiently. Other conditions, such as rain, temperature, humidity, smog, air particulate density and the like may affect drying times and effectiveness of paint being applied. The environmental sensors 1004 may detect some or all of these factors, thereby enabling the aerial vehicle 100 to anticipate and mitigate such local weather occurrences. Information from the environmental sensors 1004 may be augmented by third-party weather information providers. Furthermore, the environmental sensors 1004 may be located physically distant from the aerial vehicle 100, as a non-limiting example, attached to the top of a structure on a hill. In such instances the environmental sensors 1004 would communicate wirelessly with the base station 300 or the aerial vehicle 100 to transmit information and data.

In an embodiment, sensors contained within the aerial vehicle 100, the base station, the environmental sensor 1004 and/or other aspects of the aerial system 200 detect the user 602 and other individuals within the operational area 1006 location, augmenting the user locator 1002 data. In another embodiment, these sensors allow the user locator 1002 to be omitted while still periodically or continuously identifying the locations of the users 602 and other individuals within and around the operational area 1006.

Figure 12:
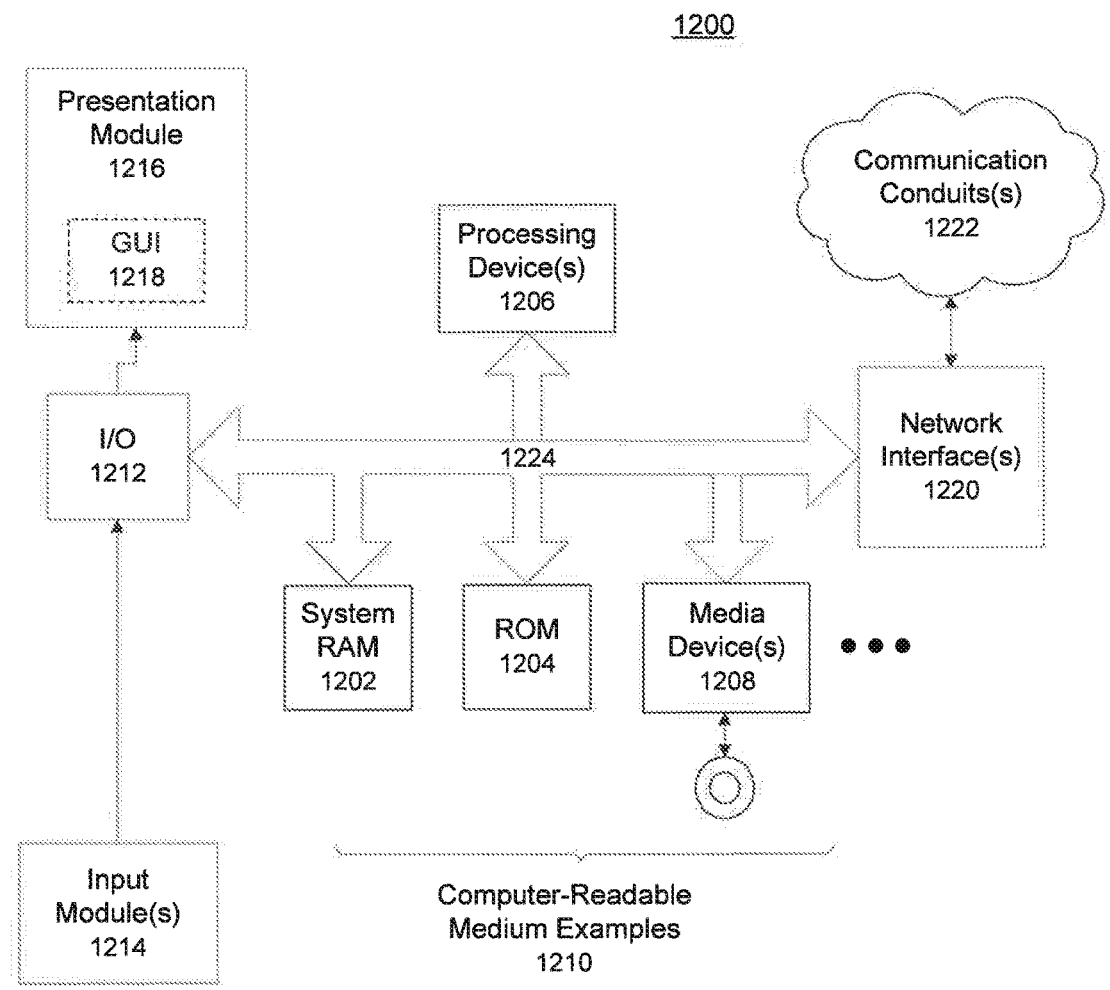
FIG. 12 shows a block diagram of an embodiment of a computing system useful for implementing an embodiment disclosed herein.
Figure 12:

Referring now to FIG. 12, a block diagram of an embodiment of a computer system useful for implementing various aspects the processes disclosed herein is shown. That is, FIG. 12 sets forth an illustrative computing functionality 1200 that may be used to implement the command and control system 122, the command override module 502, the base station 300, the mobile computing device 402, or any other portion of the aerial operations system 200 or the aerial vehicle 100. In all cases, the computing functionality 1200 represents one or more physical and tangible processing mechanisms. The computing functionality 1200 may comprise volatile and non-volatile memory, such as RAM 1202 and ROM 1204, as well as one or more processing devices 1206 (e.g., one or more central processing units (CPUs), one or more graphical processing units (GPUs), and the like). The computing functionality 1200 may also optionally comprise various media devices 1208, such as a hard disk module, an optical disk module, and so forth. The computing functionality 1200 may perform various operations identified above when the processing device(s) 1206 executes instructions that are maintained by a memory, or memory device (e.g., RAM 1202, ROM 1204, and the like).

More generally, instructions and other information may be stored on any computer readable medium 1210, including, but not limited to, static memory storage devices, magnetic storage devices, and optical storage devices. The term "computer readable medium" also encompasses plural storage devices. In all cases, the computer readable medium 1210 represents some form of physical and tangible entity. By way of example, and not limitation, the computer readable medium 1210 may comprise "computer storage media" and "communications media."

"Computer storage media" comprises volatile and non-volatile, removable and non-removable media implemented in any method or technology for storage of information, such as computer readable instructions, data structures, program modules or other data. The computer storage media may be, for example, and not limitation, RAM 1202, ROM 1204, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, the communication media comprises wired media such as a wired network or direct-wired connection, and wireless media such as acoustic, RF, infrared, and other wireless media. Combinations of any of the above are also included within the scope of the computer readable medium.

The computing functionality 1200 may also comprise an input/output module or modules 1212 for receiving various inputs (via input modules 1214), and for providing various outputs (via one or more output modules). One particular output mechanism may be a presentation module 1216 and an associated GUI 1218. The computing functionality 1200 may also include one or more network interfaces 1220 for exchanging data with other devices via one or more communication conduits 1222. In an embodiment, one or more communication buses 1224 communicatively couple the above-described components together.

The communication conduit(s) 1222 may be implemented in any manner (e.g., by a local area network, a wide area network (e.g., the Internet 112), and the like, or any combination thereof). The communication conduit(s) 1222 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), cryptographic processors, various microprocessors, microcontrollers, etc.

The terms "service," "module" and "component" as used herein generally represent software, firmware, hardware or combinations thereof. In the case of a software implementation, the service, module or component represents program code that performs specified tasks when executed on one or more processors. The program code may be stored in one or more computer readable memory devices, as described with reference to FIG. 12. The features of the embodiments described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

The aerial operations system 200 may be configured in other ways and/or utilized to perform other tasks including but not limited to following a person and take video/photos. As a non-limiting example, using either an RFID chip or a connection to the user's cell phone the aerial vehicle 100 can follow the person, running a race for example, and capture video of the event, while also autonomously navigating obstacles such as power lines.

Additionally, the aerial operations system 200 may be configured to inspect for damage in high rise buildings, towers, bridges, airplanes, dams and the like.

The aerial operations system 200 may be configured to collect soil samples, drill into the ground in order to collect samples, assist in the search for lost children, locate various items, retrieve items from cabinets, bring beverages, and the like.

The aerial operation system 200 may be configured to work in tandem or conjunction (coordination with) with multiple aerial systems. Multiple systems 200 can work independently or together to complete functions such as spraying de-icing or other cleaners or chemicals on airplane wings, buildings, roofs, solar panels, etc.

Figure 13:
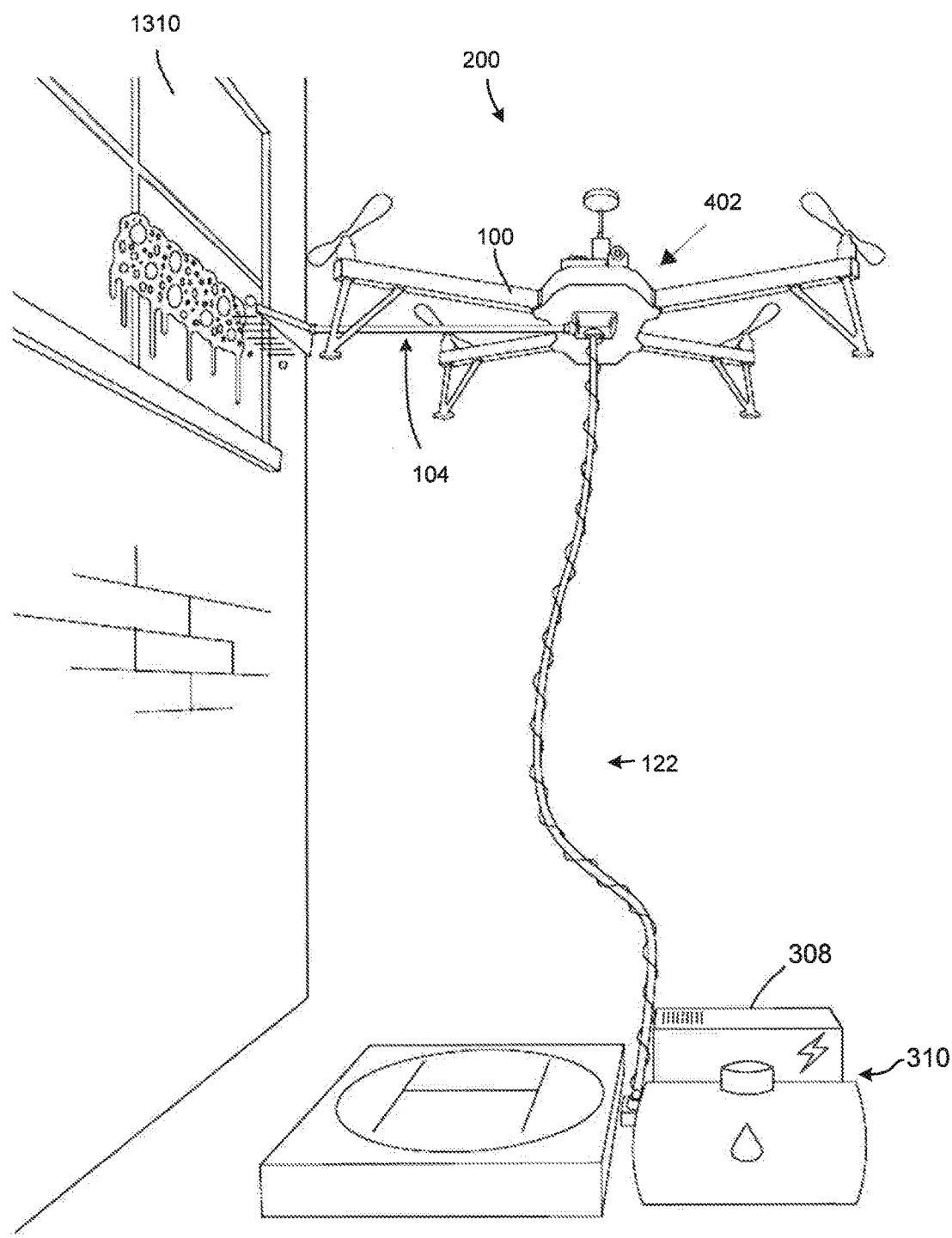
FIG. 13 shows a perspective view of an embodiment of an aerial operations system equipped with a sprayer in operation.

FIG. 13 shows a perspective view of an embodiment of an aerial operations system equipped with a sprayer in operation. In this embodiment, the 402 is aboard the aerial vehicle and commanding operations from there. As shown a window 1310 is being cleaned with a sprayer assessor 104.

FIG. 14 shows a perspective view of another embodiment of an aerial operations system equipped with a sprayer in operation. The different extruded material, including additive manufacturing materials in such a way that successive layers of material are laid down/extruded under computer control when comparing FIGS. 13 and 14, further illustrated that the embodiments disclosed herein may function with various materials. As shown in FIG. 14, the 402 is detached from the aerial vehicle 100.

A tether connection portion 1320 connects tether 122 to aerial vehicle 100. Tether connection 1320 may be a permanent or removable connection and be configured to provide data, power, and fluid connections to or from aerial vehicle 100. The tether 122 may include a liquid transportation channel 136 and an electrical and or data connection 138. Electrical connection 138 supplies power to aerial vehicle 100, including on board back up batteries, from ground power such as shore power (e.g., a wall socket) or ground power station 130.

As disclosed above, the accessory 104 may be an appendage or other member attached or removably attachable to aerial vehicle 100 at an accessory attachment point 132. The accessory attachment point 132 may be a quick release mechanism. The accessory 104 may be changed in order to adapt the aerial vehicle 100 to specific uses. The accessory may comprise an accessory attachment point 106, such as a spray nozzle as described above. In an embodiment, the aerial vehicle 100 may comprise multiple accessories 104. Some accessories 104 may be equipped with sensors such as pressure sensors in order to aid in precisely identifying the location of walls and the like. The accessory 104 may include additional sensors.

The accessories 104 may be rigidly mounted to the aerial vehicle 100 or they may be mounted for movement on a mount 134. The mount 134 may comprise one or more motors or actuators controllable by command and control system in order to adjust the orientation of, extend, retract, rotate, or otherwise manipulate and position, as a non-limiting example, the attached spray nozzle 106. Such movement is advantageous for cleaning, painting, orienting the accessory 104 to reach or point in directions that are otherwise inaccessible and the like. Specifically, a painting accessory attached for movement to the aerial vehicle 104 may be pitched upward by causing motor to point accessory 104 upward, altering the attitude of the aerial vehicle 100 by pitching a portion of the vehicle upward, or both, in order to cut in near the top of an interior wall. Such action may be necessary in order to avoid running into the ceiling or other obstacle. As disclosed above, a sensor or another device may be attached and function through the accessory 104. A non-limiting example of such another device or sensor is a camera accessory that may have an infrared light emitted attached or modularly added to the accessory 104.

Though FIGS. 13 and 14 show embodiments of the aerial system 200 to apply a material to a building, other non-limiting examples are also possible. As disclosed above, the aerial system 200 may be used within an enclosed space. As a non-limiting example, the aerial system 200 may be used to apply a pesticide to an inner hull of a ship, such as within a cargo hull.

As further disclosed above, the accessory 104 may function to expend material in an additive manufacturing process. More specifically, the accessory 104 may process plastic, by heating the plastic, which is then sprayed onto a surface of an object or structure. Multiple layers of the heated plastic is subsequently sprayed until a thickness of the layers is achieved. Thus, the accessory 104 may further comprise a heating element or component.

In another embodiment the material applied may be a solid material or element. Non-limiting examples of such material includes, but is not limited to, a plastic, foam, cardboard, wood, sand, rock, metal, another solid rigid material, and a semi rigid material. In an embodiment, the aerial system 200 may first apply an adhesive material to an object. The aerial system may then apply the solid material to the adhesive material. The solid material is handled with the accessory, having an attachment to best accommodate the type of solid material that is being handled. In another embodiment, the material may be transported to the aerial vehicle 100 through the tether, such as with a gas, such as air wherein the solid material pulled through the tether with a vacuum. Such an approach may work with sand, rocks, or any other material that may pass through the tether.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What is claimed is:

1. A system, comprising:
    an aerial vehicle to perform a task to an object, while in an aerial mode that includes at least one of a hover mode or a slow movement mode during a predominant phase of the task being performed, the aerial vehicle further comprises a command and control system;
    a removable mobile computing device to acquire an image of the object and, when the removable mobile computing device is attached to the aerial vehicle, assists in control of the aerial vehicle while in the aerial mode and, when the removable mobile computing device is detached from the aerial vehicle, allows user selection of a candidate area of the object in the image and assists in control of the aerial vehicle with user intervention through the mobile device, wherein assist in control is further performed through the command and control system; and
    at least one attachment attachable to the aerial vehicle for facilitating the task performed to the object by the aerial vehicle while the aerial vehicle is in the aerial mode, the at least one attachment is controlled by the removable mobile computing device wherein when the removable mobile computing device is re-attached to the aerial vehicle, the aerial vehicle being controlled to perform the task to the object at the candidate area selected on the acquired image of the object.

2. The system according to claim 1, further comprising a base station comprising at least one applyable material supply reservoir that is applied to an object during the task, and a power supply.

3. The system according to claim 2, further comprising a tether extending between the aerial vehicle and the base station, to transfer applyable material to the object from the reservoir to the aerial vehicle for application, with the at least one attachment, of the applyable material to the object, wherein at least one of transfer and application of the applyable material is controlled by the removable mobile computing device.

4. The system according to claim 3, wherein the mobile computing device communicates at least one of wirelessly or via a wire tether with the aerial vehicle when detached from the aerial vehicle.

5. The system according to claim 3, wherein the applyable material comprises at least one of a foam material, an insulation material, water, soap, a cleaning solution, paint, another coating, a chemical, a pesticide, an herbicide, a plastic, an epoxy, a liquid metal, a resin, ink, liquid concrete, another liquid, a gas, a liquid material which comprises small solid material mixed within, and a gas which comprises small solid material mixed within.

6. The system according to claim 3, wherein the tether comprises a wired connection to the command and control system wherein the command and control system directs the aerial vehicle via the wired connection with assistance of the mobile computing device.

7. The system according to claim 1, wherein the task comprises additive manufacturing using an additive manufacturing composition and the at least one attachment comprises a heating element to transform applyable material to the additive manufacturing composition for additive layering of the composition on the object until a thickness of the additive manufacturing composition is achieved.

8. The system according to claim 1, wherein the mobile computing device identifies a structure to which the aerial vehicle performs the task, receives instructions regarding the task to perform, and performs the task including determining and executing at least one of a flight path, an application blueprint, and a pattern to complete the task.

9. The system according to claim 1, wherein the mobile computing device comprises an imaging device to acquire the image of the object.

10. The system according to claim 1, wherein the task comprises applying at least one of a non-solid element and a solid element to the object with the at least one attachment controlled by the mobile computing device.

11. The system according to claim 10, wherein the non-solid element comprises at least one of a foam material, an insulation material, water, soap, a cleaning solution, paint, another coating, a chemical, a pesticide, a herbicide, a plastic, an epoxy, a liquid metal, a resin, ink, liquid concrete, another liquid, a gas, a liquid material which comprises small solid material mixed within, and a gas which comprises small solid material mixed within.

12. The system according to claim 10, wherein the solid element comprises at least one of a plastic, foam, cardboard, wood, rock, metal, another solid rigid material, and a semi rigid material.

13. The system according to claim 1, wherein the mobile computing device assists in determining whether to move at least one of the aerial vehicle from a first location in the hover mode to a second location and the at least one attachment to perform the task.

14. The system according to claim 1, wherein the task comprises painting of the object and further comprising sensors to detect a surface of the object wherein the removable mobile computing device pilots the aerial vehicle to an attitude and a position to place the at least one attachment normal to the surface.

15. The system according to claim 1, wherein the task comprises painting of the object; and the removable mobile computing device to pilot the aerial vehicle to an attitude and position to place the at least one attachment approximately three to six inches from a surface of the object being painted.

16. A method comprising:
capturing an image of an object by an imaging device of a detachable mobile computing device when attached to an aerial vehicle;
identifying the object, via a graphical user interface, to apply a material onto with information acquired specific to the object with the detachable mobile computing device that is functionally attached to and detached from the aerial vehicle that while in an aerial mode can apply the material to the object;
receiving selection, by the detachable mobile computing device when detached from the aerial vehicle, of at least one specific area on the object in the image to apply the material;
providing instructions to the detachable mobile computing device, the instructions including at least one of a flight path, an application blueprint, and a pattern, for the aerial vehicle to follow to apply the material to the object;
executing, by the detached mobile computing device when attached to the aerial vehicle, the instructions; and
causing, by the detachable mobile computing device when attached to the aerial vehicle, the aerial vehicle while in an aerial mode to dispense the material to the object at the at least one specific area based on the executed instructions.

17. The method according to claim 16, wherein identifying the object comprises utilizing at least one of radar detection, laser range finding, optical surveys to identify the object.

18. The method according to claim 16, wherein specifying at least one specific area comprises analyzing the image to determine the at least one specific area.

19. The method according to claim 18, wherein analyzing the image comprises manually selecting the at least one specific area through a user interface of the mobile computing device.

20. The method according to claim 16, wherein the at least one of the flight plan, application blueprint, and pattern is determined based on at least one of a technique used to apply the non-solid element, a desired operation work time of the aerial vehicle, and an operational limitation of the aerial vehicle.

21. The method according to claim 16, further comprising determining a location of the mobile computing device when the image is captured and offsetting that location by a relative location of the object.

22. The method according to claim 16, further comprises updating the at least one of flight path, application blueprint, and pattern by the aerial vehicle based information acquired about the material previously applied.

23. The method according to claim 16, further comprising transporting the material from a base station to the aerial vehicle through a tether that extends between the aerial vehicle and the base station wherein transporting the material is controlled by the mobile computing device.

24. The method according to claim 16, wherein the material comprises applying at least one of a non-solid element and a solid element to the object with the at least one attachment controlled by the mobile computing device.

25. The method according to claim 24, wherein the non-solid element comprises at least one of a foam material, an insulation material, water, soap, a cleaning solution, paint, another coating, a chemical, a pesticide, an herbicide, a plastic, an epoxy, a liquid metal, a resin, ink, liquid concrete, another liquid, a gas, a liquid material which comprises small solid material mixed within, and a gas which comprises small solid material mixed within.

26. The method according to claim 24, wherein the solid element comprises at least one of a plastic, foam, cardboard, wood, rock, metal, another solid rigid material, and a semi rigid material.

27. The method according to claim 16, further comprising further updating the instructions based on information acquired about material previously applied to the object during implementation of at least one of the instructions and a prior implemented plan.

28. The method according to claim 16, wherein the causing to dispense the material includes performing additive manufacturing using an additive manufacturing composition with at least one attachment comprising an element to transform the material to the additive manufacturing composition for additive layering of the composition on the object until a thickness of the additive manufacturing composition is achieved.

29. The method according to claim 16, wherein the causing to dispense the material includes extruding the material through an attachment.

30. The method according to claim 16, wherein the causing of the aerial vehicle while in the aerial mode to dispense the material comprises performing painting of the object and further comprising:
detecting, by sensors, a surface of the object;
causing the aerial vehicle to an attitude and position to place an attachment normal to the surface.

31. The method according to claim 16, wherein the causing of the aerial vehicle while in the aerial mode to dispense the material comprises performing painting of the object; and further comprising:
causing the aerial vehicle to an attitude and position to place an attachment approximately three to six inches from a surface of the object being painted.

32. The method according to claim 16, wherein the object comprises at least one of a surface, window, building, statute, wall, bridge, ship, land vehicle, air vehicle, field, tree, and mountain.

* * * * *